Dec. 3, 1968  A. FEROY  3,414,006
AUTOMATIC CUSHION RELIEF VALVE
Filed July 27, 1966  2 Sheets-Sheet 1

INVENTOR.
ARNE FEROY
BY
Robert W. Beach
ATTORNEY

Dec. 3, 1968  A. FEROY  3,414,006
AUTOMATIC CUSHION RELIEF VALVE
Filed July 27, 1966  2 Sheets-Sheet 2
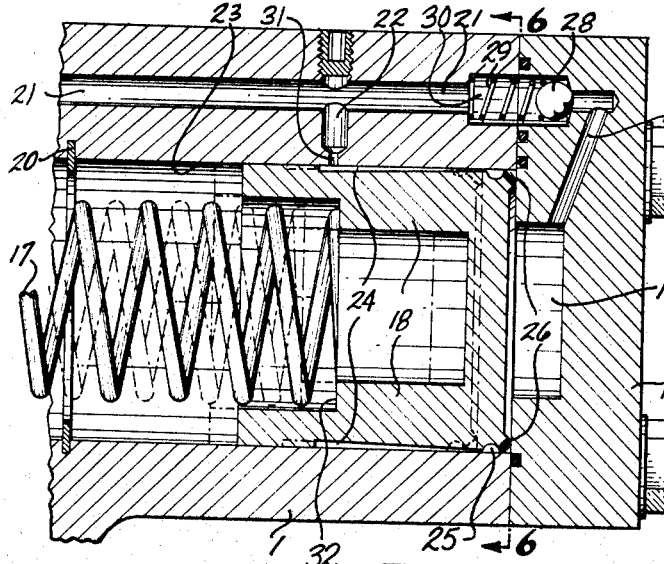
Fig. 5.
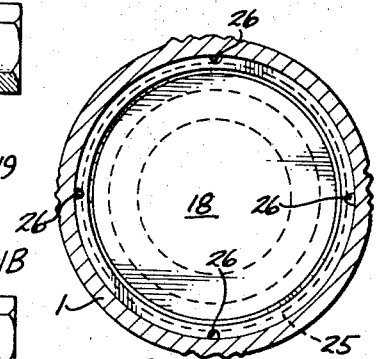
Fig. 6.
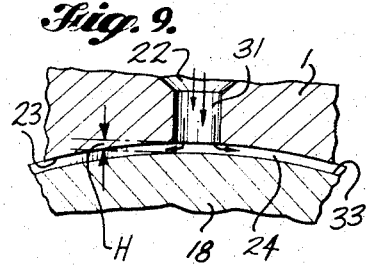
Fig. 9.
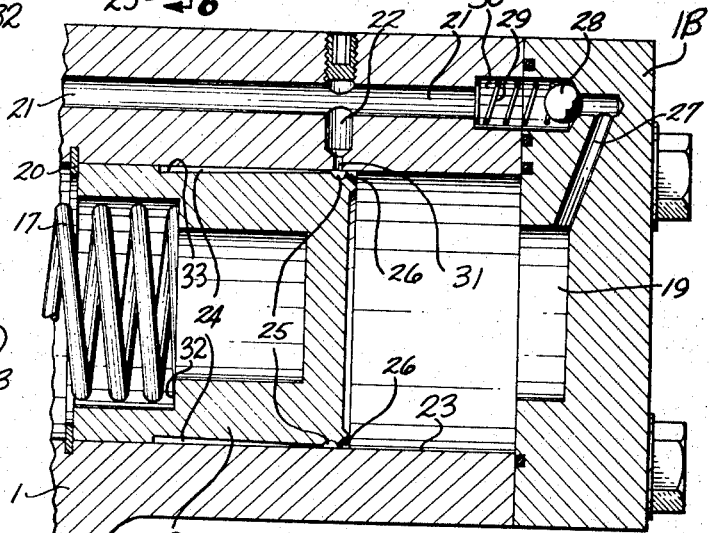
Fig. 7.
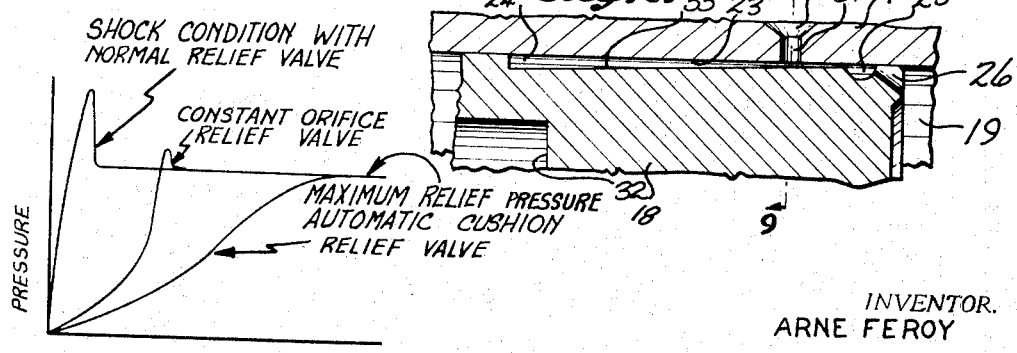
Fig. 8.
Fig. 10.
INVENTOR.
ARNE FEROY
BY
Robert W. Beach
ATTORNEY

United States Patent Office 3,414,006
Patented Dec. 3, 1968

3,414,006
AUTOMATIC CUSHION RELIEF VALVE
Arne Feroy, Kent, Wash., assignor to Amadyne, Inc., Seattle, Wash., a corporation of Washington
Filed July 27, 1966, Ser. No. 568,184
6 Claims. (Cl. 137—494)

This invention relates to cushion relief valves for controlling the rate of fluid pressure increase in hydraulic systems.

In present hydraulic systems where there is a tendency for shock and excessive pressure surges to occur, a control valve and a fixed setting relief valve are usually employed. The smoothness of stopping and starting a given load will depend upon the rate at which fluid pressure increases in the system resulting from operation of the control valve. A sudden opening of the control valve will, for example, cause severe shock due to the fixed setting of the relief valve. It is well known that a relief valve, when subjected to a sudden surge of pressure rise, will not react quickly, so that for a short interval of time the fluid pressure will rise above that of the relief valve's normal setting. The resulting shock wave is often of such magnitude that components of the hydraulic circuit become damaged.

In some cases shock and pressure surges of this nature can be partially relieved by using a relief valve in combination with an air, or spring-actuated, accumulator. While partially reducing the shock aspect, this combination does not regulate and control the rate of pressure increase.

An object of this invention is to provide an automatic cushion relief valve which will effect a gradual increase in pressure in a hydraulic system from an initial desired minimum value to a final desired maximum value.

An additional object is to provide such a valve which will effect such a gradual increase in pressure at a substantially constant rate, or at a rate varying according to any desired predetermined program. Another object is to provide means for selecting or varying the time period during which such increase in fluid pressure occurs.

A still further object of the invention is to effect such an increase in pressure automatically, and which pressure increase is not affected by the manner in which the control valve or other components of the system are operated.

It is also an object to provide such an automatic cushion relief valve which is reliable in operation, compact and relatively inexpensive.

These and other objects of the invention will be more apparent to one skilled in the art from the following specification and the accompanying drawings of the invention.

For accomplishing the foregoing objects the automatic cushion relief valve is provided in a hydraulic system. It will divert and relieve fluid as may be necessary to enable the pressure in the system to build up gradually to a predetermined maximum relief or working pressure. A representative valve construction capable of accomplishing these objects includes a valve body having a primary piston element subjected to the differential pressure of the supply and discharge lines of the hydraulic system, which piston element is spring-loaded toward a position closing communication between such lines. The spring pressure exerted on the primary piston element is increased by progressively increasing hydraulic pressure on an auxiliary piston element opposing the movement of the primary piston element toward relief position in which fluid flow from the supply line to the discharge line is increased. The rate of increase in hydraulic pressure on the auxiliary piston element is dependent upon the operation of a flow restrictor in the passage through which fluid is supplied to effect movement of the auxiliary piston.

FIGURE 5 is an enlarged longitudinal section through the right end portion of the valve mechanism, as shown in FIGURE 1.

FIGURE 6 is a transverse section through the valve mechanism on line 6—6 of FIGURE 5.

FIGURE 7 is an enlarged longitudinal section of the valve mechanism through the right end portion of the valve mechanism, as shown in FIGURE 4.

FIGURE 8 is an enlarged detail longitudinal section of a portion of the valve mechanism shown in FIGURES 5 and 7 with parts in different positions.

FIGURE 9 is a transverse section through the valve mechanism of FIGURE 8 on line 9—9 of that figure.

FIGURE 10 is a diagram showing various comparative rate-of-pressure-change curves for different types of relief valves.

Figure 1:
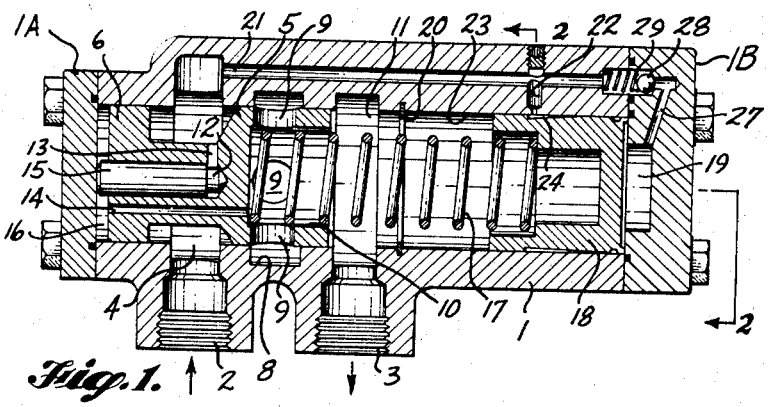
FIGURE 1 is a longitudinal section of the valve mechanism, taken on line 1—1 of FIGURE 2.
Figure 2:
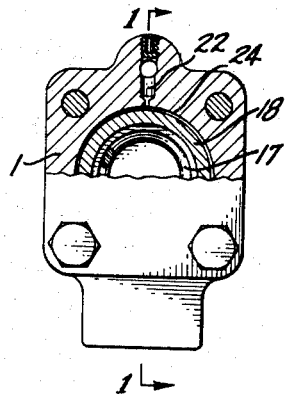
FIGURE 2 is a partial transverse section of the valve mechanism on line 2—2 of FIGURE 1.

The valve mechanism chosen for illustration includes a valve body 1 having its opposite ends closed by plates 1A and 1B. In opposite ends of the valve body chamber are slidably received piston elements 6 and 18, separated by spring 17. A smaller plunger 15 is located in a chamber 12 disposed concentrically within the end of piston element 6 adjacent to end plate 1A. In a cavity 30 in the opposite end plate 1B are check valve ball 28 and spring 29.

Through inlet port 2 annular groove 4 is always operably connected to the high pressure portion of the hydraulic system, while outlet port 3 always connects annular groove 11 to the low pressure part of the hydraulic system, such as by the use of various existing shuttle valves. Groove 4 is further connected to chamber 19 in end plate 1B in the end of the valve body 1 opposite piston element 6 through passage 21, check valve cavity 30 and passage 27. Passage 21 is connected to a chamber 24 located between the annular surface 33 of a circumferential recess in auxiliary piston element 18 and the inner cylindrical wall 23 of valve body 1, by means of hole 22 and orifice 31 shown in FIGURES 5, 7 and 8. Chamber 24 may have an axial cross section of any number of configurations which will depend upon the desired performance of the invention. For purposes of illustration, the axial cross section of chamber 24 is shown as being wedge-shaped, tapering away from primary piston element 6 and to the right in FIGURES 5, 7 and 8. Chamber 24 is further connected to valve body chamber 19 through annular groove 25 and notches 26 in the end periphery of auxiliary piston element 18.

Figure 3:
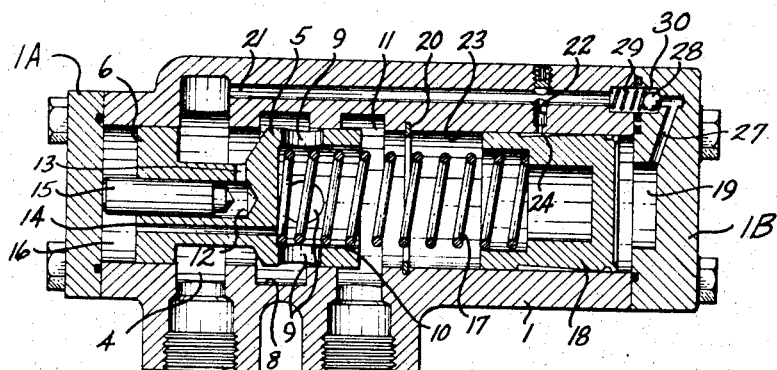
FIGURE 3 is a longitudinal section similar to FIGURE 1 but showing components in different positions.

At the left end of the valve mechanism primary piston element 6 is provided with a radial hole 13 connecting annular groove 4 with the inner end of chamber 12 in the center of such piston element, in which plunger 15 is located. Piston element 6 is further provided with an axial hole 14 which connects low pressure chamber 16 to the center hollow 10 of such piston element which is open to the low pressure annular groove 11 in the valve body 1. Adjacent to a circumferential land 5 of piston element 6 located between chamber 12 and the hollow 10 of such piston element, radial holes 9 extend through the piston element wall to connect its hollow 10 with an annular groove 8 in the wall of the valve body 1 into which the land 5 can move as the piston element reciprocates from the position of FIGURE 1 to that of FIGURES 3 and 4.

The ports 2 and 3 of the valve body 1 are to be operably connected to the two fluid lines leading to and from a fluid motor device. As previously stated, the high pressure line is always operably connected to inlet port 2, while the low pressure line is always operably connected to outlet port 3. This arrangement is not shown but is conventional and well known.

In operation the automatic cushion relief valve performs as follows:

Upon admitting fluid to a hydraulic system in which the valve body 1 is connected, fluid enters inlet port 2 and associated groove 4, filling chamber 12 through hole 13. Such fluid exerts pressure on plunger 15, forcing primary piston element 6 to the right until its land 5 is moved into groove 8, to permit fluid to flow from groove 4 through groove 8, holes 9 and hollow 10 to low pressure groove 11 and outlet port 3. The pressure in inlet port 2 and groove 4 at which this relief flow commences is termed "initial relief pressure" and is defined as that pressure acting in chamber 12 and groove 4 which is sufficient to move piston element 6 to the right, in opposition to the force of spring 17, far enough to open a fluid passage from high pressure groove 4 to low pressure groove 8 when the spring seat 32 of piston element 18 is at its extreme right position.

At the same time fluid at the initial relief pressure also enters chamber 24 through passage 21, hole 22 and orifice 31, and then flows to chamber 19 through groove 25 and notches 26 in piston element 18. As a result of fluid entering chamber 19, piston element 18 is forced toward the left in FIGURES 3 and 8, compressing spring 17, thereby increasing the resistance which piston element 6 must overcome in order to maintain the previously mentioned relief flow from inlet port 2 and groove 4 to low pressure groove 8, and thus also increasing the pressure in the inlet port 2, groove 4 and the high pressure portion of the hydraulic circuit. Passage 14 in primary piston element 6 serves as a restrictor eliminating rapid fluctuations in the motion of such piston element.

The time rate at which auxiliary piston element 18 moves to the left is a function of the rate at which fluid enters chamber 19, this rate being substantially the same as the rate at which fluid enters chamber 24 through orifice 31, and is determined by the flow characteristics of the restriction associated with orifice 31 and the pressure acting on the fluid. The fluid pressure, i.e., relief pressure, is increasing as piston element 18 moves to the left because of the progressive increase in force exerted by spring 17 on primary piston element 6 as such spring is contracted.

The flow characteristics of the restrictor formed by the flow-metering passage between the discharge end of orifice 31 and the annular surface 33 of the auxiliary piston element circumferential recess are such that the flow is a function of the distance H (see FIGURE 9) measured between the inner discharge end of the orifice 31 and that portion of the recess annular surface in radial registry with such orifice. The cross-sectional area of orifice 31 is made substantially greater than the maximum flow-metering passage formed by the cylindrical fluid-escape area between the circular orifice edge and the annular surface 33 of the recess so that the orifice cross section does not influence the restrictor characteristics.

The restricted flow is easily calculated for design purposes by the following familiar formula for flow between parallel plates:

$$Q = KPH^3$$

where

Q is the rate of flow, cubic inches per minute,
P is the fluid pressure differential across the restrictor, pounds per square inch,
H is the distance between the parallel plates, i.e., the distance between surfaces 23 and 33, inches, and
K is a parameter which includes bulk modulus, viscosity and other constant factors.

It is advantageous when building up or increasing the hydraulic pressure of a system to maintain a substantially continuous pressure-time relation, which insures that no hydraulic shock or pressure discontinuities can occur. As previously stated, the relief-pressure increase results from progressive compression of spring 17 effected by movement of auxiliary piston element 18 to the left, which increases the force that primary piston element 6 must overcome in order to maintain relief flow of fluid. Consequently when the rate of travel of piston element 18 is continuous, the relief pressure-time relation will also be a continuous function.

For example, should it be required that system relief pressure be increased linearly with time, the necessary requisite is that the rate of motion of piston element 18 to the left be constant, which requires that chamber 19 be filled with liquid at a constant rate. Since system pressure is increasing, distance H must be decreased according to the above formula in order to maintain a constant flow rate through the restrictor to chamber 19, thereby maintaining the constant rate of motion of piston element 18 to the left to produce increase of relief pressure at a uniform rate.

Figure 4:
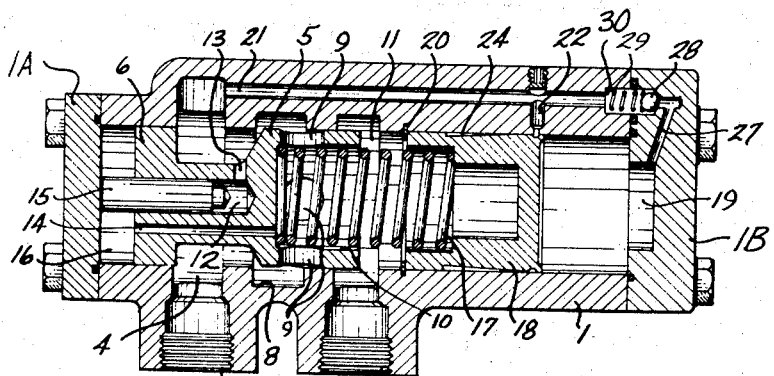
FIGURE 4 is a longitudinal section similar to FIGURES 1 and 3, but showing components in still different positions.

System pressure continues to increase, in the manner described, while auxiliary piston element 18 is forced to the left until it stops against stop ring 20 in the position of FIGURES 4 and 7. At this time orifice 31 is in direct communication with circumferential groove 25 in piston element 18, so that fluid can flow directly from such orifice through groove 25 and notches 26 in such piston element to chamber 19, thus producing full pressure on the right side of the piston element. Because piston element 18 has reached the left end of its stroke against stop ring 20 as shown in FIGURE 4, spring 17 will not be further compressed and system pressure will have reached its maximum value. This final pressure is defined as "maximum relief pressure" and is designated as the maximum operating system pressure. Further pressure increase is prevented by the action of plunger 15 and primary piston element 6 which maintain relief from groove 4 to the low pressure region 10 as previously described. Adjustment of maximum and minimum relief pressure settings can be provided by selecting springs 17 of different stiffness, or by altering the different plunger and piston element dimensions. In the foregoing description the pressure-time relation is linear; it is understood, however, that this relation may take any desired form, which will be determined by the axial profile of the annular surface 33 of the circumferential recess in piston element 18 according to the above formula.

A hydraulic system of which the automatic cushion relief valve is a part is secured when system pressure is reduced substantially to zero with piston elements 6 and 18 and spring 17 returned to their initial no-pressure positions of FIGURE 1. The discharge passage 27, leading from the chamber 19 back to the passage 21, is controlled by the ball check valve 28 held seated by spring 29 as long as liquid under pressure is being supplied to the inlet port 2. When the supply of liquid under pressure is interrupted the liquid in chamber 19 will escape past the check valve 28 to the passage 21, and thence to the inlet port 2, while the piston 18 is returned from its position of FIGURES 7 and 4 to its position of FIGURES 5 and 1 by the force of the helical compression spring 17.

In FIGURE 10 a comparison is shown of the type of pressure schedule in a hydraulic system obtained by the use of a normal relief valve, by the use of a constant orifice relief valve and by using the automatic cushion relief valve of the present invention. In approaching the maximum relief pressure the pressure in the system builds up very rapidly by use of the normal relief valve to a value considerably in excess of the maximum relief pressure, thus subjecting the mechanism to shock loads.

By the use of a constant orifice relief valve the pressure builds up more gradually initially, but the increase accelerates at higher values of pressure so that in this instance also, the pressure exceeds, at least to some extent, the maximum relief pressure, as well as increasing more rapidly than is desirable. As indicated by the automatic cushion relief valve curve, on the contrary, the increase in pressure is continuous with no pressure surges or discontinuities when a bleed passage including a smooth profiled depth circumferential recess as calculated by the above formula is used. Moreover, the maximum relief pressure is attained without being preceded by a higher pressure. Consequently, the full load of the hydraulic system mechanism is picked up gradually and smoothly without the imposition of any shock load on components of the system.

Having now described the invention and its operation, it is obvious that the objects, as stated, have been attained in a practical manner. While a specific embodiment of the invention has been shown and described, it is understood that changes may be made in construction and in the arrangement of various parts without departing from the spirit or scope of the invention as expressed in the following claims.

I claim as my invention:

1. An automatic cushion relief valve for controlling the rate of fluid pressure increase in hydraulic systems, comprising a valve body having a longitudinal bore, ports communicating with said bore at locations spaced axially thereof, a primary piston element slidable in such bore to control communication between said ports, an auxiliary piston element slidable in such bore, a compression spring engaged between said piston elements, a primary fluid passage communicating between one of said ports and the end portion of said valve body bore remote from said primary piston element, check valve means in said primary fluid passage openable for flow of fluid out of such bore end but blocking reverse flow, a secondary fluid passage communicating between said primary fluid passage and a portion of such bore remote from said primary piston element through a portion in lateral registry with said auxiliary piston element, and variable fluid restrictor means in said secondary passage variable in response to movement of said auxiliary piston element along such bore to control flow of fluid through such portion of said secondary fluid passage in registry with said auxiliary piston element.

2. The valve defined in claim 1, in which the ports include an outlet port communicating with the portion of the valve body bore between the piston elements and an inlet port communicating with a portion of the valve body bore to which a portion of the primary piston element remote from the spring is exposed, the primary fluid passage being in communication with said inlet port, and the variable restrictor means includes an orifice opening into the valve body bore and the auxiliary piston element has a recess in its surface portion in registry with such orifice.

3. The valve defined in claim 2, in which the auxiliary piston recess is a shallow annular groove.

4. The valve defined in claim 3, in which the depth of the annular groove varies progressively in an axial direction to regulate flow of fluid through the orifice in accordance with a predetermined schedule as the auxiliary piston element moves along the bore.

5. The valve defined in claim 2, in which the auxiliary piston recess is a shallow annular groove decreasing progressively in depth away from the primary piston element so as to increase the restriction of the orifice as the auxiliary piston moves toward the primary piston.

6. The valve defined in claim 1, and a stop ring in the bore engaged by the auxiliary piston element for limiting the movement toward the primary piston element.

References Cited

UNITED STATES PATENTS

| | | |
|---|---|---|
| 1,579,940 | 4/1926 | Iversen. |
| 2,411,930 | 12/1946 | Mathys. |
| 2,555,334 | 6/1951 | Green _____ 137—494 XR |

M. CARY NELSON, *Primary Examiner.*

R. J. MILLER, *Assistant Examiner.*